United States Patent [19]
Suzuki et al.

[11] Patent Number: 4,534,637
[45] Date of Patent: Aug. 13, 1985

[54] CAMERA WITH ACTIVE OPTICAL RANGE FINDER

[75] Inventors: Takashi Suzuki; Susumu Matsumura; Keiji Ohtaka, all of Kanagawa, Japan

[73] Assignee: Canon Kabushiki Kaisha, Tokyo, Japan

[21] Appl. No.: 656,430

[22] Filed: Oct. 2, 1984

Related U.S. Application Data

[63] Continuation of Ser. No. 446,954, Dec. 6, 1982, abandoned.

[30] Foreign Application Priority Data

Dec. 12, 1981 [JP] Japan .................................. 56-200325

[51] Int. Cl.³ .............................................. G03B 3/00
[52] U.S. Cl. ..................................................... 354/403
[58] Field of Search ................ 354/403, 165, 166, 219

[56] References Cited

U.S. PATENT DOCUMENTS

| | | | |
|---|---|---|---|
| 3,953,863 | 4/1976 | Lang | 354/25 |
| 4,025,785 | 5/1977 | Mueller | 354/403 X |
| 4,200,380 | 4/1980 | Sato et al. | 354/219 |
| 4,358,190 | 11/1982 | Sakai | 354/219 X |

*Primary Examiner*—William B. Perkey
*Attorney, Agent, or Firm*—Toren, McGeady, Stanger, Goldberg Kiel

[57] ABSTRACT

In the disclosed camera, an optical arrangement projects substantially collimated light rays from a light emitter toward an object through an objective system in a finder, and a light receiver produces a signal that determines the relationship between the object and the camera by detecting the light from the objective system after reflection by the object.

12 Claims, 4 Drawing Figures

CAMERA WITH ACTIVE OPTICAL RANGE FINDER

This is a continuation of application Ser. No. 446,954, filed Dec. 6, 1982, now abandoned.

BACKGROUND OF THE INVENTION

1. Field of the Invention

This invention relates to cameras, and particularly with view finders that also serve as light projection arrangements for distance measurements between the camera and an object.

2. Description of the Prior Art

Cameras with conventional automatic focusing mechanisms use triangulation systems in which imaging optics at one end of the base line cooperate with a movable mirror with other imaging optics at the other end of a base line such that moving the mirror to make the two images coincide allows one to obtain the distance to the object from the angle of the mirror. In another known system, a signal is emitted from the camera and the distance to the object is obtained from the angle of the signal returned from the object. Other than ultrasonic systems, such range finding mechanisms or automatic focusing mechanisms need two optical windows, one for projecting light and another for sensing returned light. Furthermore, aside from the window for a taking lens, one more window would be needed for an Alberda view finder, or two more windows for a mark system view finder. Thus, altogether four or five windows must be provided in autofocus blade-shutter cameras. Recently, very compact cameras have been brought on the market. The space on these cameras is so limited that it is difficult to provide four or five windows on their front surfaces. Moreover, when the base line of the automatic focusing device is made short, the accuracy of the distance measurement is decreased. Therefore, it is difficult to manufacture compact cameras with built in automatic focusing devices.

SUMMARY OF THE INVENTION

It is an object of the present invention to provide a view finder which also acts as a light projection optics for a distance measurement system.

It is another object of the present invention to provide a view finder with autofocus optical system which needs less optical windows and smaller space, and is suitable for a ultra-compact camera.

This invention is characterized in that the view finder and the light emitting optics have a common objective optics. The view finder consists of an objective optics and an eye piece arranged behind the objective optics. The light emitting optics for a distance measurement consists of the same objective optics, a reflecting mirror which is provided slantly between the objective optics, the eye piece, and a light source positioned outside the optical path of the view finder.

A part of the light emitted from the light source is reflected by the reflecting mirror and directed through the objective optics toward the object to be photographed.

DESCRIPTION OF THE PREFERRED EMBODIMENTS

Figure 1:
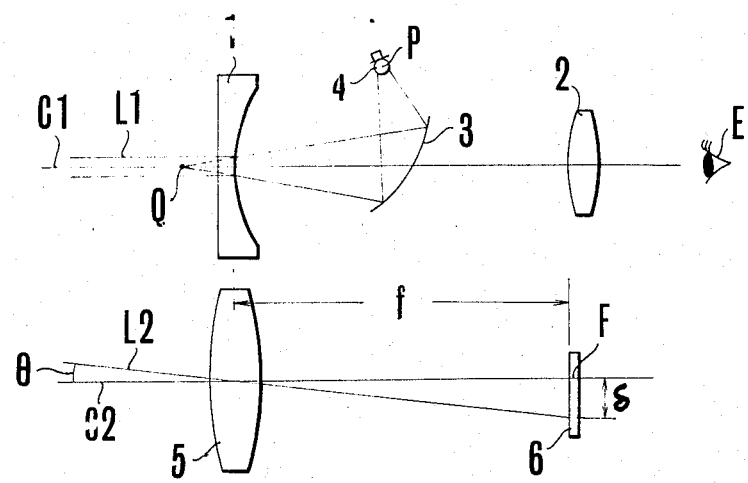
FIG. 1 shows a construction of the view finder of the present invention.

The present invention will be explained in detail in accordance with the drawings of the embodiments hereof. In FIG. 1, an objective lens 1 consisting of a concave lens and an eye piece lens 2 consisting of a convex lens are arranged coaxially with the optical axis C1 of the view finder so as to constitute the so called Alberda view finder. Between the object lens 1 and the eye piece lens 2, a concave mirror 3 consisting of for example a dichroic mirror reflecting the infrared ray but allowing the transmission of the visible light is arranged slantly to the optical axis C1 of the view finder. The concave mirror 3 is preferably a portion of the ellipsoidal mirror which has a focal point P outside of the optical axis C1 and another focal point Q on the optical axis C1. At the point P above the concave mirror 3, a light source consisting of an infrared light emitting diode 4 for the distance measuring signal is arranged so as to emit the light toward the concave mirror 3. Further, a light sensing optics is arranged in parallel to the view finder optics, whereby the optical axis C1 of the view finder optics is almost parallel to that C2 of the light sensing optics. In the light sensing optics at the position of the focal point F of the light sensing lens 5, a light sensing element 6 is provided. The light sensing element 6 is arranged near the focal point F in such a manner that angle $\theta$ of the reflected light beam L2 of the distance measuring signal is converted into a length $\delta$ from the optical axis C2 of the light sensing element 6.

When the light is emitted through the window of the finder optics in this way, the distance can be measured as follows. The infrared light emitted from the light source 4 at the point P is reflected by the concave mirror 3 and converged toward the point Q, whereby due to the negative power of the objective lens, the light is emitted outside of the objective lens 1 as the distance measuring light beam L1, which is converged 2-3 m in front of the objective lens or parallel or diverged with small angle, for example about 5°. The light beam L1 is reflected from the object and incident upon the light sensing optics. When the reflected light beam L2 is imaged at a position by $\delta$ distant from the optical axis C2 on the light sensing element 6, the distance D between the camera and the object can be obtained from the relation $D = L \cdot f / \delta$, whereby $\delta$ is the distance from the optical axis C2 of the light sensing element 6, L is the distance between the optical axis C1 and C2, and f is the focal length of the light sensing lens 5. Hereby, because the concave mirror 3 reflects the infrared light but transmits the visible light, the object to be photographed can be observed through eye piece with enough visible light. Further, if the mirror 3 is made of very thin glass plate, the quality of the image to be observed is protected from deterioration.

Figure 2:
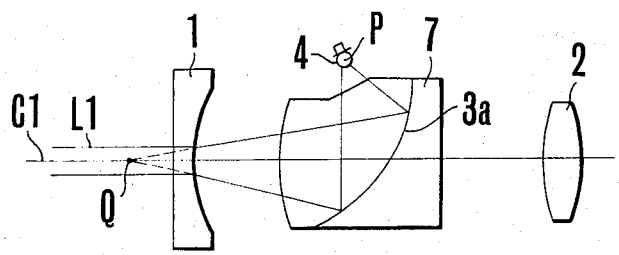
FIGS. 2, 3 and 4 respectively show an embodiment of the view finder optics.

In the following, the second embodiment of the view finder optics will be explained with reference to FIG. 2. The arrangement of the present embodiment is almost similar to that of the first embodiment, whereby the concave mirror 3a is sandwiched between the transparent blocks consisting of glass or plastics. Though the function of the concave mirror 3a is same as that of the concave mirror 3 of the first embodiment, the concave mirror 3a can easily be produced in case of the present embodiment. Furthermore, by making the surface of the block to be semi-reflective for visible light, and providing the reflecting pattern, for example the distance measuring field mark or field frame, on or near the eye piece lens, such pattern can be observed superimposed in the object field. Because, through the eye piece lens 2, the vertual image of such pattern is observed with the aid of the reflection of the imaging beam by the half permeable mirror. Further, by giving a refracting power to a part of the block 7, it is possible to collect the light beam of the light source 4 effectively to the objective lens 1.

Figure 3:
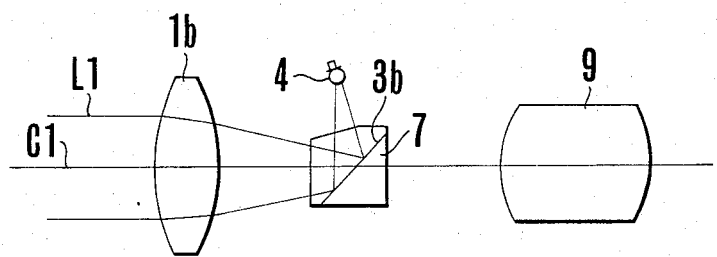

FIG. 3 shows the third embodiment. In case of the present embodiment, the objective lens 1b is supposed to have a positive power and instead of the above concave mirror 3a, a reflecting mirror such as a plane or a convex mirror is used. Hereby, in the same way as in case of the above concave mirrors 3 and 3a the reflecting mirror 3b reflects the infrared light but allows the transmittance of the visible light. Further, in case the objective lens 1b is a convex lens, by constituting the eye piece lens with a convex lens the object field is observed by the eye E of the photographer as an inverted image, so that it is necessary to convert the image to the erecting image by the optics corresponding to the eye piece lens. Further, it must be arranged a negative power lens in front of the light source 4 so as to balance the positive refracting power of the objective lens 1b.

Figure 4:
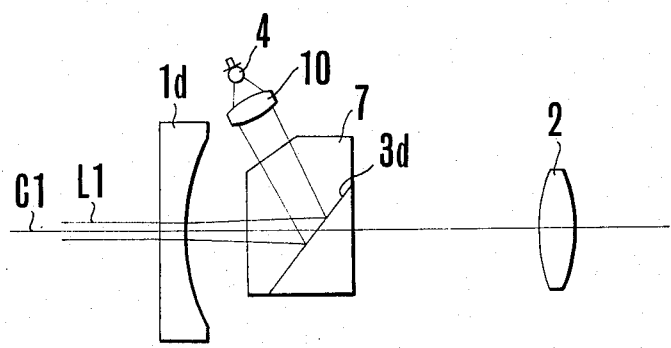

Below, the fourth embodiment will be explained with reference to FIG. 4. In the same way, as in case of the first embodiment, the objective lens 1d is a negative power concave lens and the eye piece lens 2 is a convex lens, whereby a plane mirror 3d is used as the reflecting mirror. Between the LED 4 and the plane mirror 3d, a convex lens 10 is provided, and the light beam emitted from the LED 4 is converged by the convex lens 10 and reflected by the plane mirror 3d. Then, the reflected convergent light beam is compensated by the objective lens 1d consisting of a concave lens into an almost parallel light beam L1, and is directed to the object in the same way as in case of the previous embodiment.

As described so far, the present invention can reduce the number of the optical windows and realize a compact camera provided with an automatic focusing function by building the light projecting system in the view finder optics. Although the light beam for the distance measurement may be reflected and directed toward the objective lens by providing the conventional beam splitter with plane surface slantly across the optical axis of the view finder, the light beam emitted from the view finder is divergent due to ordinary negative power of the objective lens.

On the other hand, in the present invention the divergent light beam emitted from the light source is converted into convergent beam with the refracting or reflecting optics having positive power arranged in the projecting optics. The convergent light beam is emitted from the view finder in the state of almost parallel beam by the negative power of the objective lens. Consequently, as the density of energy in the distance measuring beam is increased, the amount of light energy which is reflected from the object is also enough to detect the image position by the light sensing element. Further, because a part of the view finder optics is made use of as the distance measuring optics, i.e., the view finder optics and the light projection optics are coaxial, the position of the object whose distance is measured can easily be recognized in the finder field without parallax.

What we claim:
1. A camera comprising:
   (a) light emitting means for emitting light;
   (b) finder means for observing an image of an object; said finder means having an objective optical system;
   (c) optical means for projecting light produced from said light emitting means toward the object through said objective optical system of said finder means, said optical means being formed so that rays of light emerging from said objective optical system are substantially collimated; and
   (d) light receiving means for producing a signal for determining the relationship between the object and the camera by detecting the light from the objective system after reflection from the object.

2. A camera according to claim 1, wherein said optical means defines the light emerging from the objective optical system as lying between a converging pencil of light rays at a distance of 2 meters from the objective optical system and a diverging pencil of rays with an angle of divergence of about 5 degrees.

3. A camera according to claim 2, wherein said objective optical system has a negative power.

4. A camera according to claim 3, wherein said optical means has a concave mirror with its axis inclined with respect to an optical axis of said finder means.

5. A camera according to claim 4, wherein said concave mirror has an ellipsoidal shape with a first focal point on the optical axis of said finder and a second focal point out of the optical axis of said finder means.

6. A camera according to claim 5, wherein the first focal point of said concave mirror lies on the object side of said objective optical system.

7. A camera according to claim 6, wherein said light emitting means is positioned at the second focal point of said concave mirror.

8. A camera according to claim 6, wherein said light emitting means produces infrared light.

9. A camera according to claim 8, wherein said concave mirror is formed to reflect infrared light and to be transparent to visible light.

10. A camera according to claim 4, wherein said concave mirror is positioned in the interior of a light-permeable block made of one of glass and plastic.

11. A camera according to claim 3, wherein said optical means has a plane mirror inclined with an optical axis of said finder means and a lens for converging the light produced from said light emitting means to said plane mirror.

12. A camera according to claim 2, wherein said objective optical system has a positive power.

* * * * *